Oct. 10, 1933.  T. W. MILLER  1,930,441
CLEANING BRUSH
Filed Sept. 10, 1931
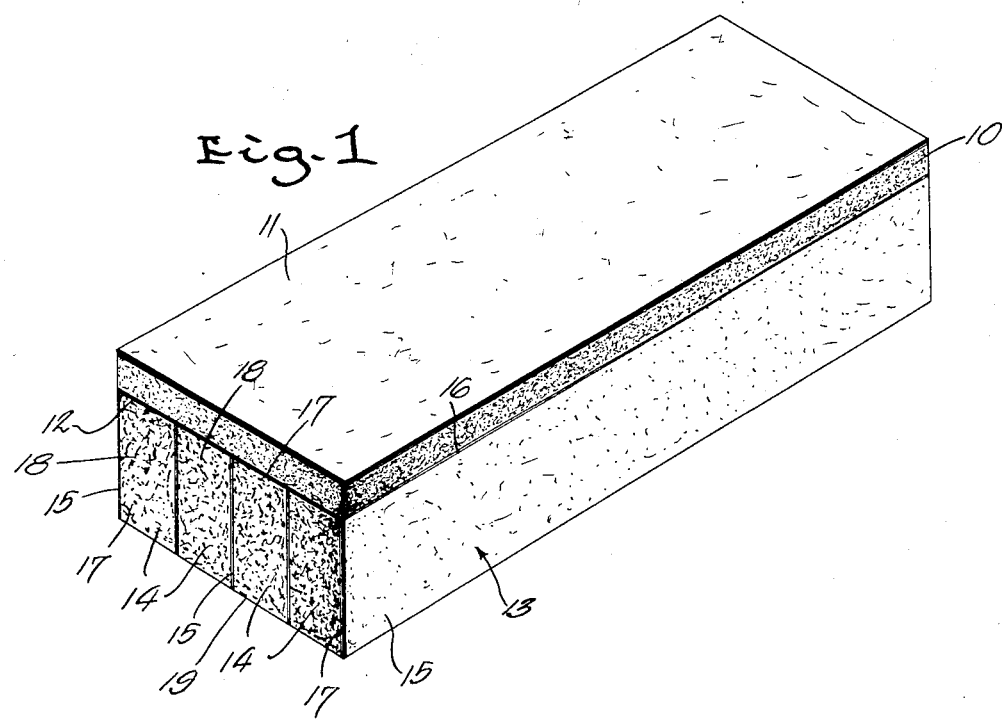
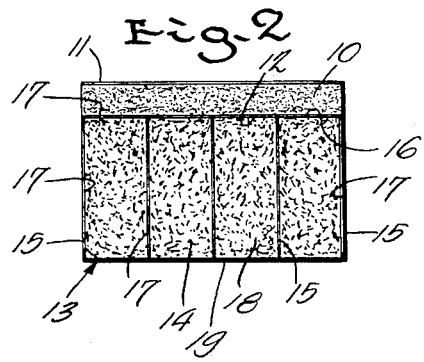
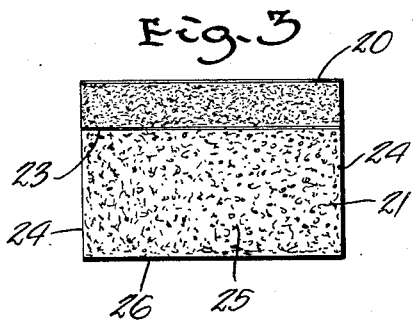
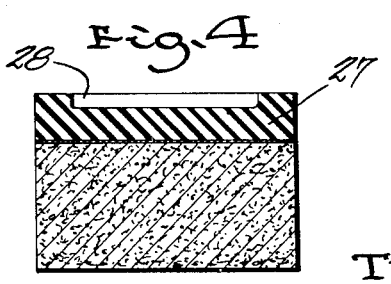
Thomas W. Miller
INVENTOR
BY Freeman and Weidman
ATTORNEYS

UNITED STATES PATENT OFFICE 1,930,441

CLEANING BRUSH

Thomas W. Miller, Ashland, Ohio, assignor to The Faultless Rubber Company, Ashland, Ohio, a corporation of Ohio Application September 10, 1931
Serial No. 562,066

4 Claims. (Cl. 15—244)

This invention relates to cleaning brushes, and has for an object the provision of a new and improved article of this character.

In the drawing accompanying this specification and forming a part of this application I have shown, for purposes of illustration, certain embodiments which my invention may assume, and in the drawing:

Figure 1 is a perspective view of one embodiment of the invention,

Figure 2 is an end view of the embodiment shown in Figure 1,

Figure 3 is an end view, disclosing a different embodiment of the invention, while Figure 4 is a transverse sectional view, disclosing another embodiment of the invention.

Referring first to Figures 1 and 2, the embodiment therein disclosed comprises a back 10 formed if semi-hard molded rubber sponge provided on its outer surface with an integral skin 11 formed as a result of the molding operation.

Cemented and vulcanized to the inner surface 12 of the back 10 is a brush member 13 composed of a plurality of molded soft rubber sponge cleaning sections 14, cemented and vulcanized side to side, and each having on its side surfaces 15 and inner face 16 integral skins 17 resulting from the molding operation, and providing continuous surfaces which facilitate the cementing and vulcanizing together of the individual rubber sponge cleaning sections 14 and the cementing and vulcanizing of the brush 13 to the back 10.

The ends 18 and faces 19 of the brush sections 14 are cut surfaces, that is, the skin resulting from molding has been entirely removed, as by cutting, so that along the operating surfaces 18 and 19 the rubber sponge appears in cut section, cellular and porous.

The skins 17 on the inner faces 16 of the brush sections 14, and the skin 11 on the outer surface of the back 10, reinforce and additionally stiffen the back 10, while the skin 11 on the outer surface of the back 10 also provides a facing of desirable characteristics.

The skins 17 on the sides 15 of the sections 14 reinforce the very flexible rubber sponge sections 14, preventing excessive lateral and longitudinal bending, and permitting greater pressure to be applied to the back 10 without excessive yielding of the brush member 13. Additionally the skins 17 on the side surfaces 15 also cause a mild scraping action by the face 19 when the brush is operated.

The cut surfaces 18 and 19 are characterized by a vacuous suctional action resulting in a clinging and drawing effect with reference to the surface contacted, and operating to draw from such surface particles which are to be removed.

The cleaning brush thus provided is especially useful for cleaning black-boards.

In Figure 3 I disclose a somewhat different embodiment of the invention, comprising a back 20, identical with the back 10, and a brush member 21, formed of molded rubber sponge, cemented and vulcanized to the back 20, and having on its abutting face an integral skin 23 resulting from the molding operation and operative to facilitate the cementing and vulcanizing of the brush member 21 to the back 20.

The sides 24, ends 25, and face 26, of the brush member 21, are cut surfaces, having the skin removed, and exposing the cellular porous rubber sponge, wherefore all of these surfaces are adapted for cleaning.

The embodiment disclosed in Figure 4 is generally similar to the embodiment shown in Figure 3, but substitutes for the back 20 of semi-hard rubber sponge a back 27 of semi-hard solid rubber, recessed at 28 to reduce the weight. The embodiment of Figure 4 is more particularly adapted for brushing clothes.

It will be understood that in any embodiment of my invention the texture and softness of the rubber sponge brush member may be predetermined to suit the use to which the brush is to be put.

It will be apparent to those skilled in the art that the embodiments herein disclosed accomplish at least the principal object of the invention, and that the construction is adaptable to a wide variety of uses, and embodies advantages other than those herein disclosed, and also that the embodiments may be variously changed and modified without departing from the spirit or scope of the invention, and accordingly it will be understood that the above disclosures are illustrative only, and that my invention is not limited thereto.

I claim:

1. A rubber sponge cleaning unit, comprising: a cleaning member having a plurality of layers of rubber sponge disposed side by side, each layer having a cut surface to expose cellular sponge texture cleaning surfaces along edges of said layers, and adjacent side surfaces of said layers having skins thereon, resulting from the molding operation to facilitate joining the side surfaces of said layers, and having said skins joined, said skins reinforcing the cleaning member and preventing excessive yielding of said rubber sponge;

and a backing member of rubber sponge, of relatively less yieldable quality than that of the rubber sponge layers, disposed along the opposite edge surfaces of said layers, continuously spanning the surfaces of said layers and the junctures therebetween, and secured to said layers, and providing a firm though flexible rubber sponge backing for reinforcing said layers.

2. A rubber sponge cleaning unit, comprising: a cleaning member having a plurality of layers of rubber sponge disposed side by side, each layer having a cut surface to expose cellular sponge texture cleaning surfaces along edges of said layers, and adjacent side surfaces of said layers having skins thereon, resulting from the molding operation to facilitate joining the side surfaces of said layers, and having said sides joined, said skins reinforcing the cleaning member and preventing excessive yielding of said rubber sponge; a backing member of rubber sponge, of relatively less yieldable quality than that of the rubber sponge layers, disposed along the opposite edge surfaces of said layers, continuously spanning the surfaces of said layers and the junctures therebetween, and secured to said layers, and providing a firm though flexible rubber sponge backing for reinforcing said layers; and skin resulting from the molding operation interposed between said cleaning member, and said backing member, facilitating joinder between said members and joined to both, and operable to reinforce the rubber sponge of both members and prevent spreading of adjacent sponge surfaces when the device is in operation.

3. A rubber sponge cleaning unit, comprising: a cleaning member of rubber sponge having a cut surface to expose a cellular sponge texture cleaning surface; a backing member of rubber sponge, of relatively less yieldable quality than that of the rubber sponge of said cleaning member, disposed along the surface of said cleaning member opposite its cleaning surface, and providing a firm though flexible backing of rubber sponge for reinforcing the softer rubber sponge of said cleaning member; and skin resulting from the molding operation interposed between said cleaning member and said backing member, facilitating joinder between said members and joined to both, and operable to reinforce the rubber sponge and prevent spreading of adjacent sponge surfaces when the device is in operation.

4. An elongated rubber sponge cleaning unit, comprising: a cleaning member having a plurality of layers of rubber sponge disposed side by side, each layer having a cut surface to expose cellular sponge texture cleaning surfaces along edges of said layers, and adjacent side surfaces of said layers having skins thereon, resulting from the molding operation to facilitate joining the side surfaces of said layers, and having said skins joined, said skins reinforcing the cleaning member and preventing excessive yielding of said rubber sponge; an elongated flat backing member of rubber sponge, of relatively less yieldable quality than that of the rubber sponge layers, disposed along the opposite edge surfaces of said layers, continuously spanning the surfaces of said layers and the junctures therebetween, and secured to said layers, and providing a firm though flexible rubber sponge backing for reinforcing said layers; and skin resulting from the molding operation extending continuously along the broad outer surface of said backing member, and along the outer side surfaces of the outer layers of said cleaning member, said backing member having its longitudinal edges cut to expose the cellular texture of the rubber sponge and interrupt the skin covering of said unit to provide a frictional surface to facilitate manipulation of said unit.

THOMAS W. MILLER.